US012791075B2

(12) United States Patent
Downey et al.

(10) Patent No.: US 12,791,075 B2
(45) Date of Patent: Nov. 10, 2026

(54) VIBRATION ISOLATION HANGER

(71) Applicant: Pliteq Inc., Toronto (CA)

(72) Inventors: Paul Charles Downey, Toronto (CA); Wilson Byrick, Toronto (CA)

(73) Assignee: Pliteq Inc., Toronto (CA)

( * ) Notice: Subject to any disclaimer, the term of this patent is extended or adjusted under 35 U.S.C. 154(b) by 0 days.

(21) Appl. No.: 18/596,177

(22) Filed: Mar. 5, 2024

(65) Prior Publication Data

US 2025/0283519 A1 Sep. 11, 2025

(51) Int. Cl.
*F16F 9/00* (2006.01)
*F16M 13/02* (2006.01)

(52) U.S. Cl.
CPC ........... *F16F 9/003* (2013.01); *F16M 13/027* (2013.01)

(58) Field of Classification Search
CPC .. F16F 9/003; F16F 9/006; F16F 9/306; F16F 15/08
USPC .......................................................... 248/613
See application file for complete search history.

(56) References Cited

U.S. PATENT DOCUMENTS

| | | | | | |
|---|---|---|---|---|---|
| 2,051,205 | A * | 8/1936 | Estabrook | H02K 5/24 | 248/343 |
| 3,203,654 | A * | 8/1965 | Sweeney | F16L 3/16 | 267/149 |
| 3,477,216 | A * | 11/1969 | Martin | A01D 46/26 | 56/340.1 |
| 4,083,522 | A * | 4/1978 | Vandersip | F16L 3/2053 | 248/59 |
| 4,934,650 | A * | 6/1990 | LeKuch | F16L 55/035 | 267/141 |
| 5,009,386 | A * | 4/1991 | Berger | F16L 3/2053 | 248/62 |
| 5,118,069 | A * | 6/1992 | Muhlethaler | F16F 3/0873 | 248/68.1 |
| 6,695,295 | B2 * | 2/2004 | Williams | F16F 15/08 | 267/140.13 |
| 9,469,929 | B2 * | 10/2016 | Park | F16F 15/08 | |
| 10,371,313 | B2 * | 8/2019 | McIntosh | F16F 9/303 | |
| 10,954,685 | B1 * | 3/2021 | Guo | E04H 9/0237 | |
| 2016/0333906 | A1 * | 11/2016 | Varga | F16B 2/18 | |
| 2019/0017283 | A1 * | 1/2019 | GangaRao | E04C 5/07 | |

* cited by examiner

*Primary Examiner* — Bradley Duckworth
(74) *Attorney, Agent, or Firm* — Rowand LLP

(57) ABSTRACT

A ceiling hanger for reducing transmission of vibrations between ceilings and equipment. The ceiling hanger includes a housing and one or more crumb rubber isolators. The housing includes a first surface, a second surface and one or more side walls connecting the first and second surface. The one or more crumb rubber isolators have through holes for receiving a fastener.

19 Claims, 8 Drawing Sheets

VIBRATION ISOLATION HANGER

TECHNICAL FIELD

The present application relates to hangers, and more particularly, to hangers for performing vibration and seismic isolation.

BACKGROUND

HVAC systems, machinery, industrial equipment, structures, and components thereof, may be damaged due to vibration, shock, and noise leading to costly repairs and replacement. Further, such equipment may transmit vibrations, shock, and noise to the structure of a building which may cause a nuisance in other portions of the building. Generally, ceiling hangers have been developed to reduce transmission of vibration, shock, and noise to and from systems, structures, and their components. Ceiling hangers are often constructed of a metal housing and a spring. They allow equipment to resist compression, tension, and shear forces due to seismic, wind, and other extreme events. Existing isolation mounts often operate over narrow load ranges.

DESCRIPTION OF THE DRAWINGS

Reference will now be made, by way of example, to the accompanying drawings which show example embodiments of the present invention. In the drawings.

Similar reference numerals may have been used in different figures to denote similar components.

DESCRIPTION OF EXAMPLE EMBODIMENTS

Figure 1:
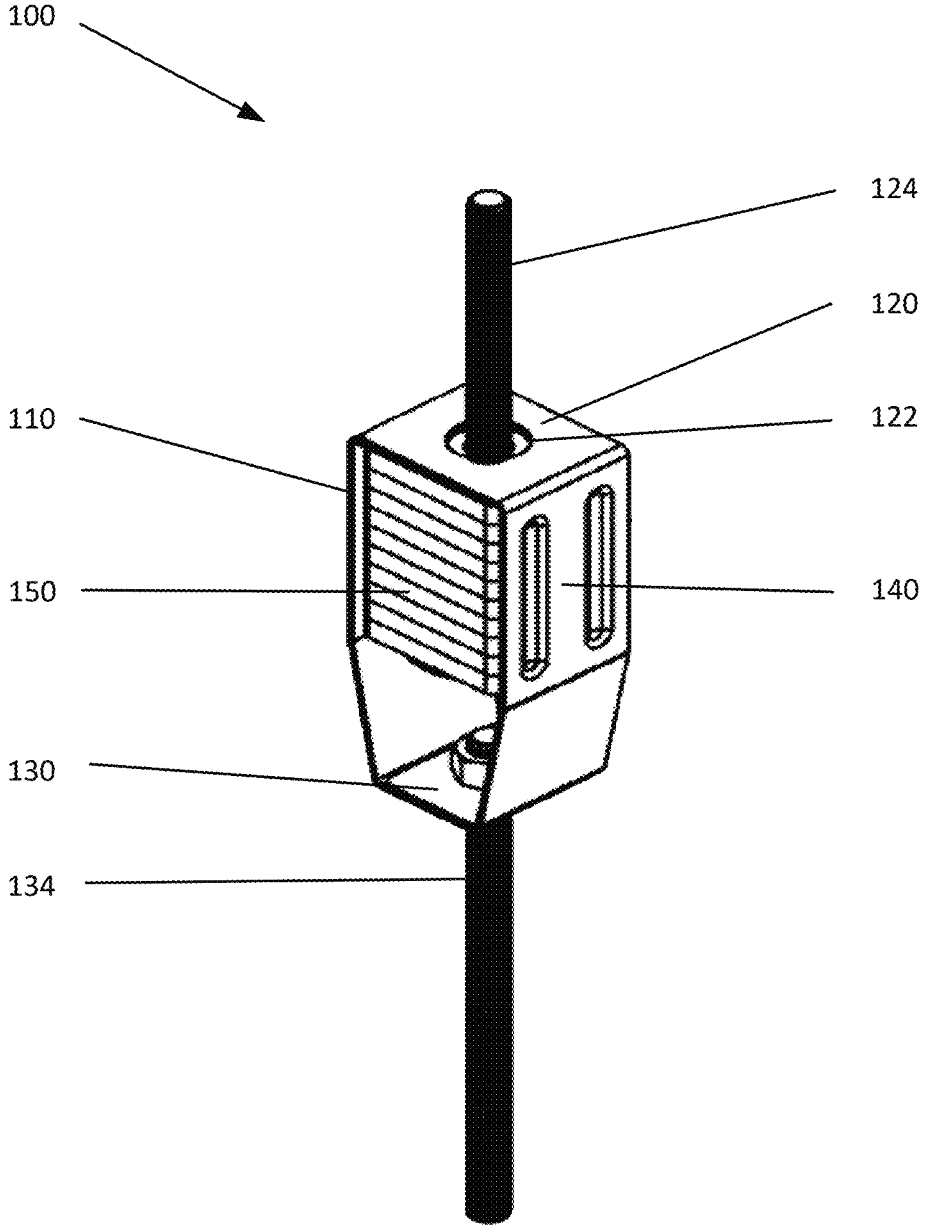
FIG. 1 illustrates a perspective view of an example of a hanger.

In one aspect, the present application describes a hanger for reducing transmission of vibrations between a surface and an apparatus. The hanger includes a housing. The housing includes a first surface defining a first hole for receiving a first fastener. The housing further includes a second surface defining a second hole for receiving a second fastener. The housing further includes one or more side walls connecting the first and second surface. The hanger further includes one or more crumb rubber isolators having through holes for receiving any one or both of the first fastener and the second fastener.

In some implementations, the hanger may include the first fastener for coupling the hanger to a surface.

In some implementations, the hanger may include the second fastener for coupling the hanger to a vibration source.

In some implementations, the crumb rubber isolators may be constructed of rebound crumb rubber.

In some implementations, the crumb rubber isolators may be constructed of recycled rebound crumb rubber.

In some implementations, the crumb rubber isolators may be constructed of easily deformable, compressible, or bendable crumb rubber.

In some implementations, the crumb rubber isolators may be constructed of at least 94% recycled rubber content.

In some implementations, the crumb rubber isolators may be generally disposed within the housing.

In some implementations, the crumb rubber isolators may be adjacent to one or both of the first surface of the housing and the second surface of the housing.

In some implementations, the crumb rubber isolators may be adjacent to an interior side of the side walls of the housing.

In some implementations, a first rubber grommet may be positioned in the first hole and a second rubber grommet may be positioned in the second hole.

In some implementations, the first and second surfaces and two side walls may include a first and a second housing bracket. Each of the housing brackets may include a first face, a second face and a side face. The side face may connect the first face and second face.

In some implementations, the first faces of the first and second housing bracket may be welded together. The second faces of the first and second housing bracket may be welded together, to couple the first and second housing bracket.

In some implementations, a steel coil spring may be affixed to an interior side of the second surface of the housing for receiving the second fastener.

In some implementations, the crumb rubber isolators may have a density ranging from 700 to 1000 $kg/m^3$.

In some implementations, the first hole of the first surface, the second hole of the second surface, and the through holes of the crumb rubber isolators may be centered and aligned.

In some implementations, the first and second fasteners may include washers, nuts, and threaded rods.

In some implementations, the two or more side walls of the housing may have gussets and the crumb rubber isolators may be shaped to fit therebetween.

In at least some implementations, one or more of the crumb rubber isolators may interlock with the gussets.

In some implementations, the first surface may have a larger surface area than the second surface of the housing. The two or more side walls near the second surface may be tapered.

In some implementations, the housing and the crumb rubber isolators may be generally rectangularly shaped.

In another aspect, a hanger assembly for reducing transmission of vibrations is described. The hanger assembly may include a surface. The hanger assembly may include a vibration source. The hanger assembly may include a hanger. The hanger may include a first fastener for coupling the hanger to the surface. The hanger may further include a second fastener for coupling the hanger to the vibration source. The hanger may further include a housing. The housing may include a first surface defining a first hole for receiving the first fastener. The housing may include a second surface defining a second hole for receiving the second fastener. The housing may include two or more side walls connecting the first and second surface. The hanger may further include one or more crumb rubber isolators having through holes for receiving one or both of the first fastener and the second fastener.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present disclosure relates to a hanger for reducing transmission of vibrations such as ceiling hangers. In particular, it is an improvement on vibration isolation hangers. Generally, hangers or isolation mounts are constructed of springs for the isolation material and metal for the housing. Hangers assist equipment by providing vibration reduction, noise control, equipment protection, and structural integrity. The hangers referred to herein may also be referred to as ceiling hangers, isolation mounts, mounts, vibration isolators, or isolators.

Generally, the isolation material of known hangers is constructed of springs or another material. While such hangers are suitable material for vibration isolation, they typically only work over a narrow load range. For example, the Kinetics SFH Hanger™ is offered in 37 different configurations. There are different bracket types, spring deflections, and spring diameters to choose from. The hangers are designed for a very small load range, especially at low loads. Accordingly, it is easy to select the wrong spring.

In at least some implementations, the present disclosure describes a hanger that uses crumb rubber as an isolation material. For example, the hanger may use recycled rebounded crumb rubber. At least some hangers described herein may offer a wider load range compared to traditional ceiling hangers.

At least some hangers described herein may support a load range from 25 lbs to 1000 lbs. Conveniently, in this way, users may spend less time and resources selecting hangers for new projects, and the same hangers may be used for projects of varying types. Further, the risk of selecting an incompatible or inappropriate hanger may be reduced.

Crumb rubber is a form of recycled rubber. Crumb rubber is generated from various sources, such as, shredding waste tires, rubber products, and industrial rubber waste. Crumb rubber has many beneficial properties with respect to its flexibility, resilience, and durability. Further, crumb rubber promotes recycling and providing an eco-friendly solution for repurposing rubber waste. By utilizing crumb rubber, valuable resources are conserved, and the environmental impact of rubber waste disposal may be reduced.

FIG. 1 illustrates a perspective view of an example of a hanger 100. The hanger 100 may be a hanger. That is, the hanger 100 may be configured to be mounted on a ceiling. The hanger 100 may include a housing 110. The hanger 100 may include one or more fasteners. For example, a first fastener 124 may be included and may be used to couple the hanger to a surface, such as a ceiling. A second fastener 134 may be included and may be used to couple the hanger to a vibration source and/or another surface. In at least some implementations, the first fastener 124 may be a top fastener and the second fastener 134 may be a bottom fastener.

The housing 110 may include a first surface 120. The first surface 120 may couple the housing to the first fastener 124. For example, the first surface 120 may defining a first hole 122 for receiving the first fastener 124.

The housing 110 may include a second surface 130. The second surface 130 may couple the housing to the second fastener 134. For example, the second surface 130 may define a second hole 132 for receiving the second fastener 134.

The housing 110 may include one or more side walls 140 connecting the first surface 120 and the second surface 130. The hanger 100 may include one or more crumb rubber isolators 150. The crumb rubber isolators 150 may have through holes 152 for receiving one or both of the first fastener 124 and the second fastener 134. In the illustrated example, the crumb rubber isolators 150 receive the first fastener 124, which is the top-most fastener in the example. In this orientation, the crumb rubber isolators 150 are mounted near the ceiling-side of the housing 110 or, put differently, at a top end of the housing 110.

The first fastener 124 may operate to affix the hanger 100 to a ceiling (not shown). For example, the first fastener 124 may fix one or more crumb rubber isolators 150 to the housing 110. For example, the first fastener 124 may pass through the first hole 122 of the first surface 120 of the housing 110. The first fastener 124 may also pass through the holes of one or more of the crumb rubber isolators 150. The first fastener 124 may include a rod and a coupling component such as a nut and, in at least some implementations, a washer. The washer may be or include a lock washer. The rod may be a threaded rod which engages the nut to couple the rod to the housing at the first surface 120.

The first fastener 124 may, in at least some implementations, couple or fasten the hanger 100 to a ceiling (not shown), which may also be referred to as a surface. In such an orientation, the hanger 100 may be referred to as a ceiling hanger.

The second fastener 134 may operate to affix a vibration source or other apparatus, such as an HVAC system, to the hanger 100. For example, the second fastener 134 may pass through the second hole 132 of the second surface 130 of the housing 110. The second fastener 134 may include a rod and a coupling component such as a nut and, in at least some implementations, a washer. The washer may be or include a lock washer. The rod may be a threaded rod which engages the nut to couple the rod to the housing at the second surface 130.

The second fastener 134 may, in at least some implementations, couple or fasten the hanger 100 to one or more of the following: equipment, machinery, systems, pumps, motors, generators, chillers, compressors, manufacturing machinery, soundproofing panels, electrical and control panels, suspended ceilings, and pipe supports.

In some implementations, the first fastener 124 and the second fastener 134 may be ½"-13 rods. The rod length and diameter may vary depending on the circumstances.

As noted above, the first fastener 124 and the second fastener 134 may each include a washer, a nut, and/or a rod. In some implementations, the hanger may include further or alternative fasteners or fastening components, such as bolts, screws, rivets, adhesives, and nails.

In some cases, the hanger 100 may be coupled to both the ceiling (not shown) and a vibration source. The hanger 100 may be oriented in a generally vertical position. The vibration source may by any one or more or a combination of electronic equipment, machinery and industrial equipment, HVAC systems, etc. The vibration source may also originate from the ceiling in some implementations. For example, in some implementations, the hanger 100 may be used to inhibit the transmission of vibrations from the ceiling to the apparatus or equipment mounted beneath the ceiling using the hanger 100. For example, the hanger 100 may be used to prevent repetitive oscillations or motions from a reference point. The vibrations, oscillations or motions may include any one or more of the following: mechanical vibrations, sound waves, vibrations in structures, vibrations in machinery, seismic vibrations, vibrations from humans or animals. In some cases, the hanger 100 may be coupled to both a first equipment and a second equipment to prevent the transmission of vibrations therebetween.

The hanger 100 includes one or more crumb rubber isolators 150. In some cases, the one or more crumb rubber isolators 150 are situated adjacent to the first surface 120 of the housing 110. In the illustrated example, the crumb rubber isolators 150 are situated within a cavity defined by the housing 110. The crumb rubber isolators 150 are, in the illustrated example, biased towards the first surface 120. That is, they are, as a group, nearer to the first surface 120 than to the second surface 130 of the housing 110. In the illustrated example, one of the crumb rubber isolators 150 is in contact with the first surface 120. The crumb rubber isolators are positioned in a stacked orientation in which each crumb rubber isolator 150 contacts an adjacent crumb rubber isolator 150.

In some cases, the one or more crumb rubber isolators 150 may be situated adjacent to the second surface 130 of the housing 110. For example, the one or more of the crumb rubber isolators may contact the second surface 130 of the housing 110. In some cases, the crumb rubber isolators 150 may be separated into two groups or portions. For example, a first group of the one or more crumb rubber isolators may be adjacent to the first surface 120 of the housing 110. A second group of the one or more crumb rubber isolators 150 may be adjacent to the second surface 130 of the housing 110. There may be a gap or space separating the first group from the second group.

The first fastener 124 may pass through one or more components of the hanger 100. For example, the first fastener 124 may pass through any one or a combination of: a first washer (not shown), the housing 110, the one or more crumb rubber isolators 150 and a first nut 126. The first fastener 124 may pass centrally through one or more such components. For example, each such component may define a hole or other void therethrough that allows the first fastener 124 to pass through. In some implementations, the crumb rubber isolators 150 may be generally rectangular shaped (including square shaped). The crumb rubber isolators 150 may define holes each having a diameter that is no more than three millimeters larger than the diameter of the rod or other fasteners that passes through them. In some implementations, the crumb rubber isolators may define holes having a diameter that is no more than one millimeter larger than the diameter of the rod or other fasteners that passes through them.

As noted above, the crumb rubber isolators or a group of the crumb rubber isolators may be situated within the housing 110 in a stacked arrangement. In at least some such implementations, the holes of the stacked crumb rubber isolators may be aligned in this stacked arrangement.

The first fastener 124 may be substantially centrally displaced through the center of the housing 110. The first fastener 124 may be substantially axially displaced in the housing 110. The first fastener 124 may enter or be inserted from the first surface 120 of the housing 110 and exit or otherwise extend through the first hole 122 to an interior of the housing 110. The first fastener 124 protrudes from the first hole 122 to an exterior of the housing 110. A first end of the first fastener 124 may be in contact with the ceiling, or a vibration source as the case may be. In some cases, a first nut 126 and/or a first washer (not shown) may be found at the second end of the first fastener 124.

The second fastener 134 may pass through one or more components of the hanger 100. For example, the second fastener 134 may pass through any one or a combination of: a washer (not shown), the housing 110, the one or more crumb rubber isolators 150, and a second nut 136. The second fastener 134 may pass centrally through one or more such components. For example, each such component may define a hole or other void therethrough that allows the second fastener 134 to pass through.

The second fastener 134 may be substantially centrally displaced through the center of the housing 110. The second fastener 134 may be substantially axially displaced in the housing 110.

The second fastener 134 may enter or be inserted from the second hole 132 of the housing 110 and exit or otherwise extend through the second hole 132 to an interior of the housing 110. The second fastener 134 protrudes from the second hole 132 to an exterior of the housing 110. The second end of the second fastener 134 may be in contact with the HVAC system, or other vibration source. In some cases, the second nut 136 and/or a second washer (not shown) may be found at the first end of the second fastener 134.

In some cases, the first hole 122 of the first surface 120, the second hole 132 of the second surface 130, and the through holes 152 of the one or more crumb rubber isolators 150 are centered and aligned so that the first fastener 124 and the second fastener 134 are generally vertical and located along the longitudinal axis of the hanger 100.

The hanger 100 may be used or installed in a vertical orientation, i.e., under deflection and in particular, compression or expansion. In some implementations, the ceiling hangers may be installed to a first surface, or ceiling by bolted installation, adhesive installation, welded installation, press-fit installation, suspended installation, or customized installation.

In some cases, the load range of the hanger 100 may be approximately between 25 lbs to 1000 lbs. In some cases, a height of the hanger 100 excluding the first fastener 124 and the second fastener 134 may be approximately between 4 and 5 inches.

In some cases, the hanger 100 prevents vibration and/or noise from permeating, transferring, and/or passing from a first surface to a second surface. The isolation mount is installed on a first surface using the first fastener 124 of the hanger 100. The second surface may be connected to the hanger by the second fastener 134. One or more crumb rubber isolators 150 may absorb the vibrations that passes through the hanger 100.

In some cases, the sources of the vibration include one or more of the following: machinery, HVAC systems, industrial equipment, electronic equipment, construction, and appliances.

Figure 2:
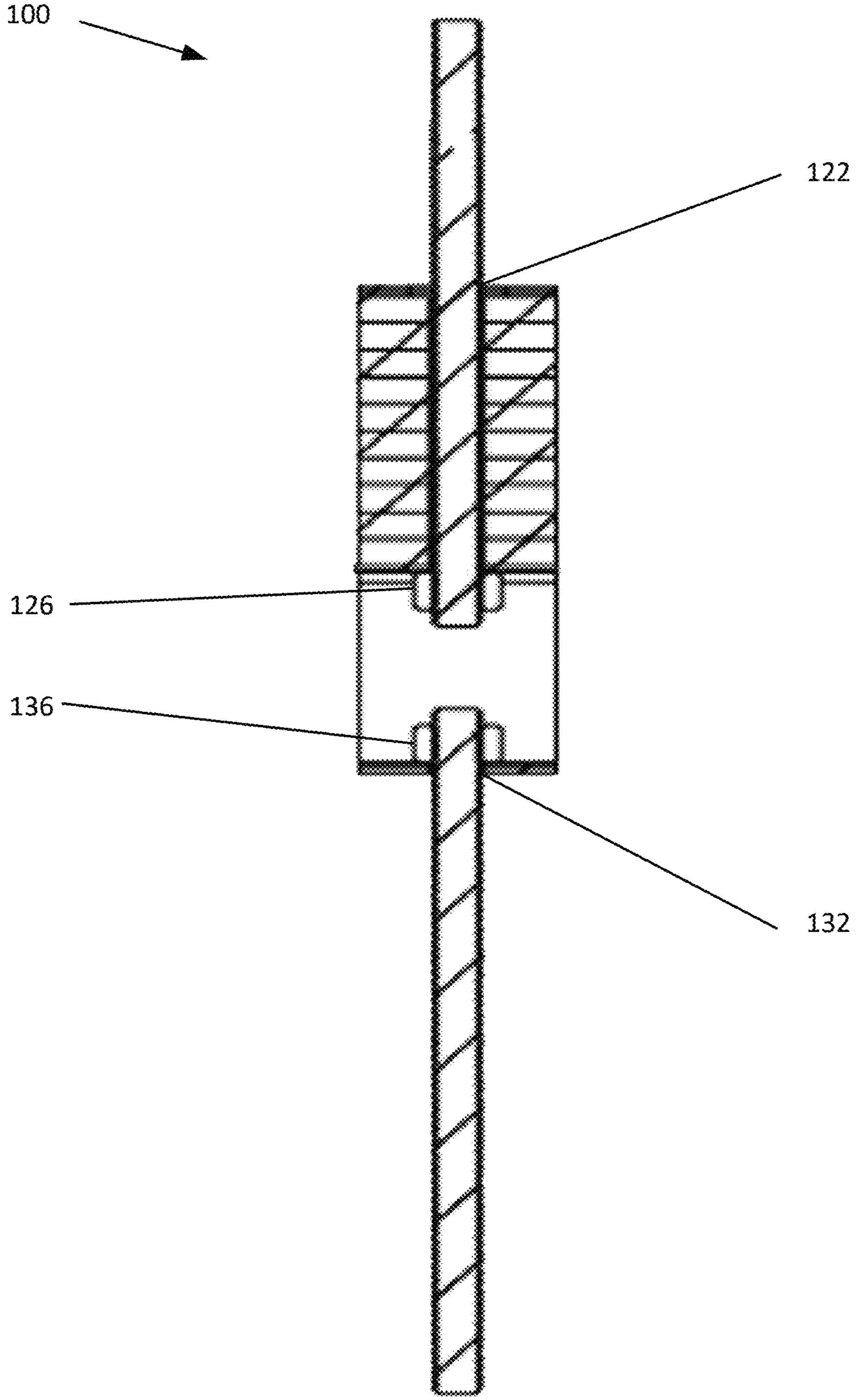
FIG. 2 illustrates a side cross-sectional view of a housing of the hanger in FIG. 1.

FIG. 2. illustrates a side cross-sectional view of an example hanger 100 from FIG. 1. The housing 110 may be constructed of a rigid material, such as metal. The housing 110 includes two housing brackets. The housing 110 defines a first hole 122 on a first surface 120 for receiving a first fastener 124. The housing 110 defines a second hole 132 on a second surface 130 for receiving a second fastener 134.

For example, the housing 110 may also have one or more side walls 140 connecting the first surface 120 to the second surface 130.

In some cases, the first hole 122 on the first surface 120 may be an aperture, an opening, or a slit. For example, the first hole 122 may be radially shaped and have side walls. The side walls of the first hole 122 may be threaded. The side walls of the first hole 122 may be coupled to the first fastener 124. Put differently, the first hole 122 on the first surface 120 may be a through hole between the upper side of the first surface 120 and the bottom side of the first surface 120. The second hole 132 of the second surface 130 may also have similar features as the first hole 122.

In some implementations, the housing 110 may include a first grommet (not shown) positioned in the first hole 122 and a second grommet (now shown) positioned in the second hole 132. The first and second grommets may be rubber grommets. The first and second grommets may be in contact or adjacent to the first and second fasteners, respectively. For example, if the first fastener is not centrally displaced or aligned as a result of noise or vibration, the first grommet may prevent the first fastener from impacting the first surface 120 of the housing 110. In some cases, the first and second grommets may be threaded.

Figure 3:
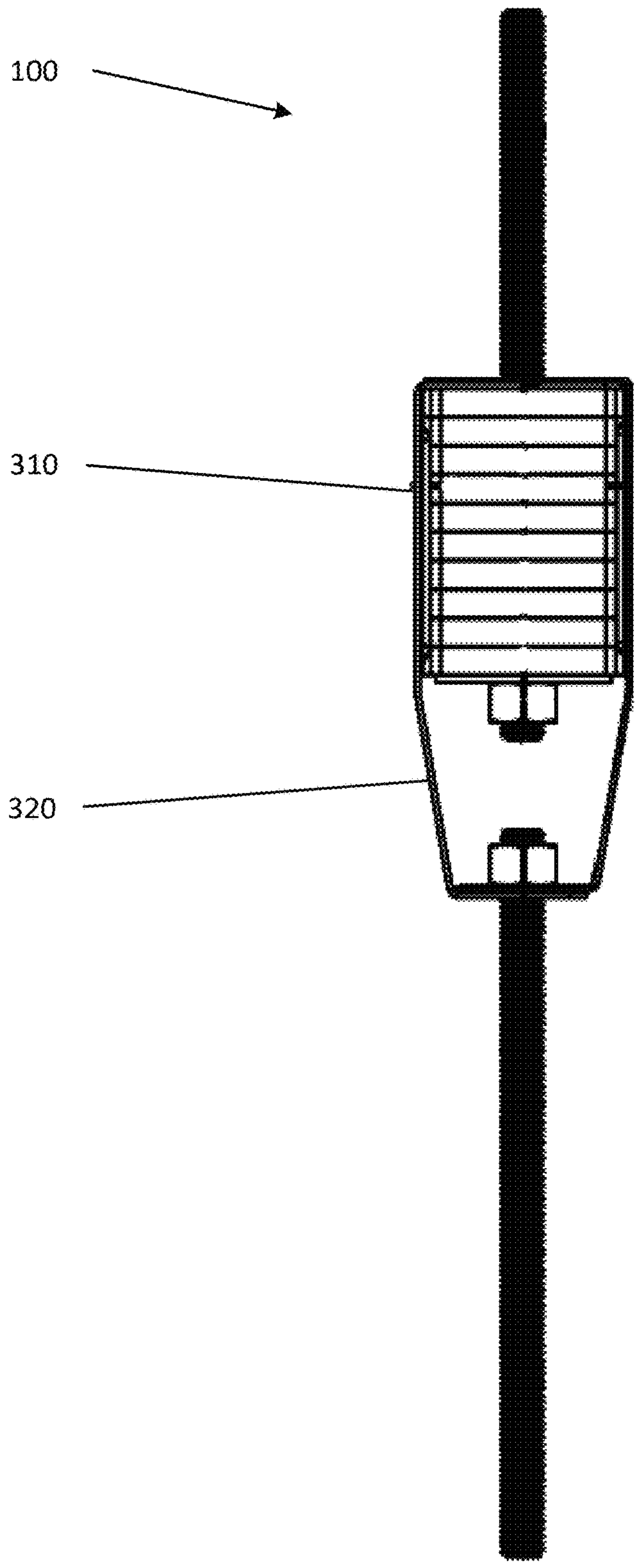
FIG. 3 illustrates a frontal view of the hanger in FIG. 1.

FIG. 3. illustrates a front view of an example hanger 100 from FIG. 1. In some cases, the housing may be rectangularly shaped with a central axis. In some cases, the housing 110 may be of any shape to secure the isolation material. In some implementations, the housing 110 may have two opposing side walls 140 and two opposing open faces exposing the interior of the housing 110. The first and second open side may be parallel to the central axis of the housing 110.

In some implementations, the housing 110 may include the first surface 120, second surface 130 and have two side walls 140 connecting thereto defining two open or void faces exposing the interior of the housing 110. The first surface 120 of the housing 110 may have a larger surface area than the second surface 130 of the housing 110. The one or more side walls 140 may be separated into a first portion 310 and a second portion 320. The interior of the first portion 310 of the one or more side walls 140 may be in contact with the one or more crumb rubber isolators 150. The first portion 310 of the one or more side walls 140 may be planner, straight, flat, and/or vertical. The second portion 320 of the one or more side walls 140 may taper towards the second surface 130 of the housing 110. For example, the second portion 320 of the one or more side walls 140 may be angled from the longitudinal axis. The tapering of the second portion 320 of the one or more side walls 140 may reduce the amount of material used to manufacture the one or more side walls 140.

In some implementations, the one or more crumb rubber isolators 150 may be adjacent to the interior side of the side walls 140 of the housing 110. For example, the one or more crumb rubber isolators 150 may be next to, adjoining, or bordering the side walls 140 of the housing 110. In some cases, the one or more crumb rubber isolators 150 may be near the side walls 140 of the housing 110. In some cases, there may be a void or a space between the one or more crumb rubber isolators 150 and the side walls 140 of the housing 110.

In some cases, the one or more crumb rubber isolators 150 may be generally disposed within the housing 110. For example, the one or more crumb rubber isolators 150 may overflow beyond the open faces exposing the interior of the housing 110. Put differently, the one or more crumb rubber isolators 150 may have a greater planer surface area than the first surface 120 of the housing 110. In some cases, the one or more crumb rubber isolators 150 may be in various shapes, such as triangle, parallelogram, oval, ellipse, and a hexagon. The housing 110 may not be able to completely encapsulate the various shapes of the one or more crumb rubber isolators. The one or more crumb rubber isolators may be exposed through the open faces of the housing 110.

In some cases, the housing 110 may be constructed of metal, such as aluminum or steel. In some cases, a powder coat may be applied on the housing 110.

The housing 110 may define at least one internal cavity. One or more of the crumb rubber isolators 150 may be situated, at least in part, in at least one of the internal cavities. For example, in FIG. 3, the housing 110 defines one internal cavity. In some cases, the one or more crumb rubber isolators 150 may be situated, at least in part, adjacent to the first surface 120 of the housing 110. In some cases, the one or more crumb rubber isolators 150 may be situated, at least in part, adjacent to the second surface 130 of the housing 110. In some cases, the one or more crumb rubber isolators 150 may be situated, at least in part, adjacent to the first surface 120 of the housing 110 and adjacent to the second surface 130 of the housing 110. For example, the one or more crumb rubber isolators 150 may be next to, adjoining, or bordering the first surface 120 and the second surface 130 of the housing. For example, there may be other objects or spaces between the one or more crumb rubber isolators 150 and the first surface 120 and the second surface 130 of the housing 110. For example, the one or more crumb rubber isolators 150 may be in close proximity to the first surface 120 and the second surface 130 of the housing 110.

In some cases, the height of the housing 110 may be approximately between 4 and 5 inches. In some cases, the width and length of the housing 110 may be approximately between 1 and 3 inches. In some cases, the width and length of the one or more crumb rubber isolators may be approximately between 1 and 3 inches.

In some cases, the height of the one or more crumb rubber isolators 150, in total (i.e., across all of the crumb rubber isolators 150 that are included) may be greater than 80 mm. In some cases, the height of the one or more crumb rubber isolators 150 may be less than 120 mm. In some cases, the height of the one or more crumb rubber isolators may be approximately 100 mm.

Figure 4:
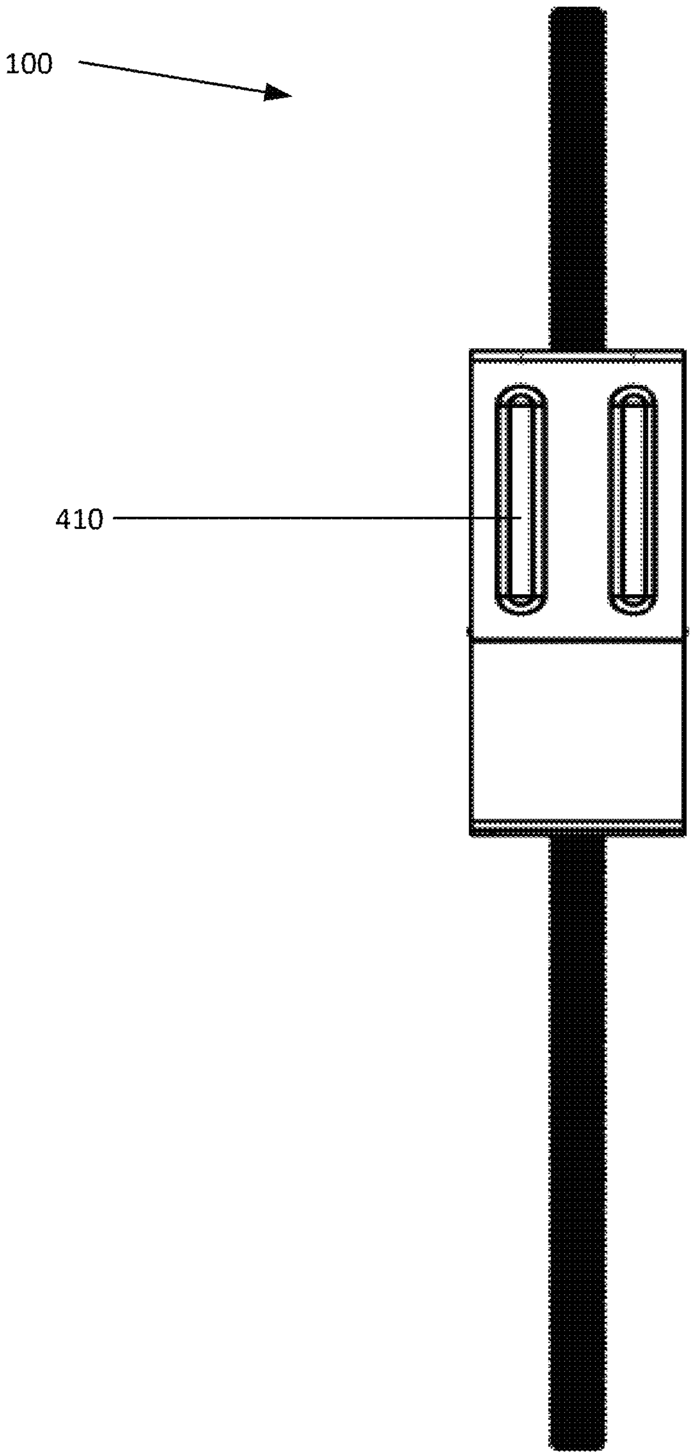
FIG. 4 illustrates a side view of the hanger in FIG. 1.

FIG. 4 illustrates a side view of an example of the hanger 100 of FIG. 1. The side walls 140 may include one or more gussets 410. A gusset 410 may be defined as a generally vertical trough or channel running along a side wall 140 of the housing 110. The one or more gussets 410 may help prevent the one or more crumb rubber isolators 150 from rotating or shifting due to noise or vibration. In at least some implementations, the crumb rubber isolators may interlock with the gussets. For example, the crumb rubber isolators may include an interlocking feature. By way of example, the crumb rubber isolators may define a void that is shaped to align with a protrusion associated with the gussets or, in other instances, the crumb rubber isolators may define a protrusion that is shaped to align with a void defined by the gussets.

The one or more gussets 410 may be approximately between 2 and 3 inches in length. The gussets 410 may, additionally or alternatively, impart strength to the housing 110.

Figure 5:
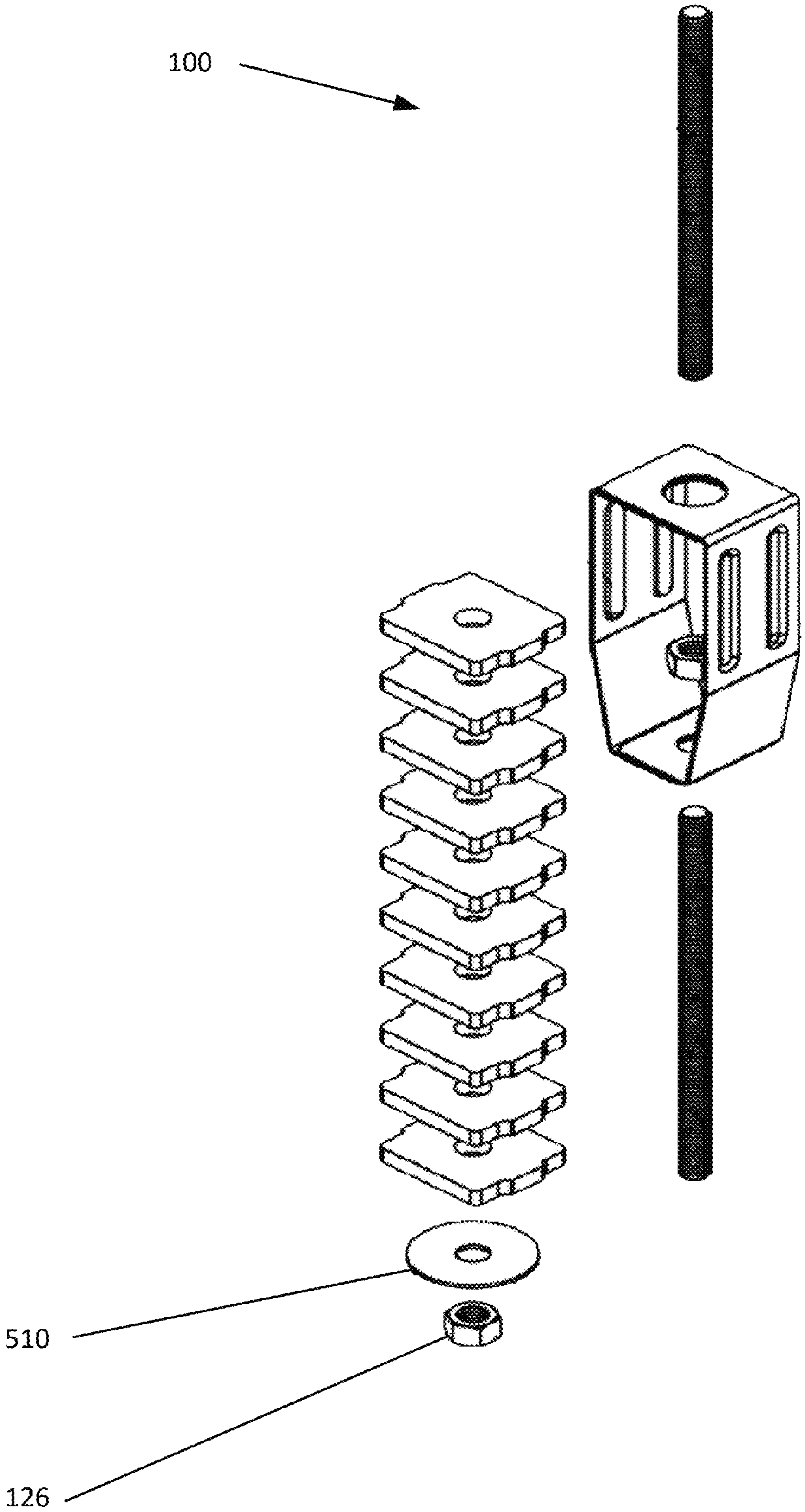
FIG. 5 illustrates an exploded perspective view of the hanger in FIG. 1.

FIG. 5 illustrates an exploded view of an example of the hanger 100 of FIG. 1. In some cases, a first washer 510 is displaced between the one or more crumb rubber isolators 150 and the first nut 126.

Figure 6:
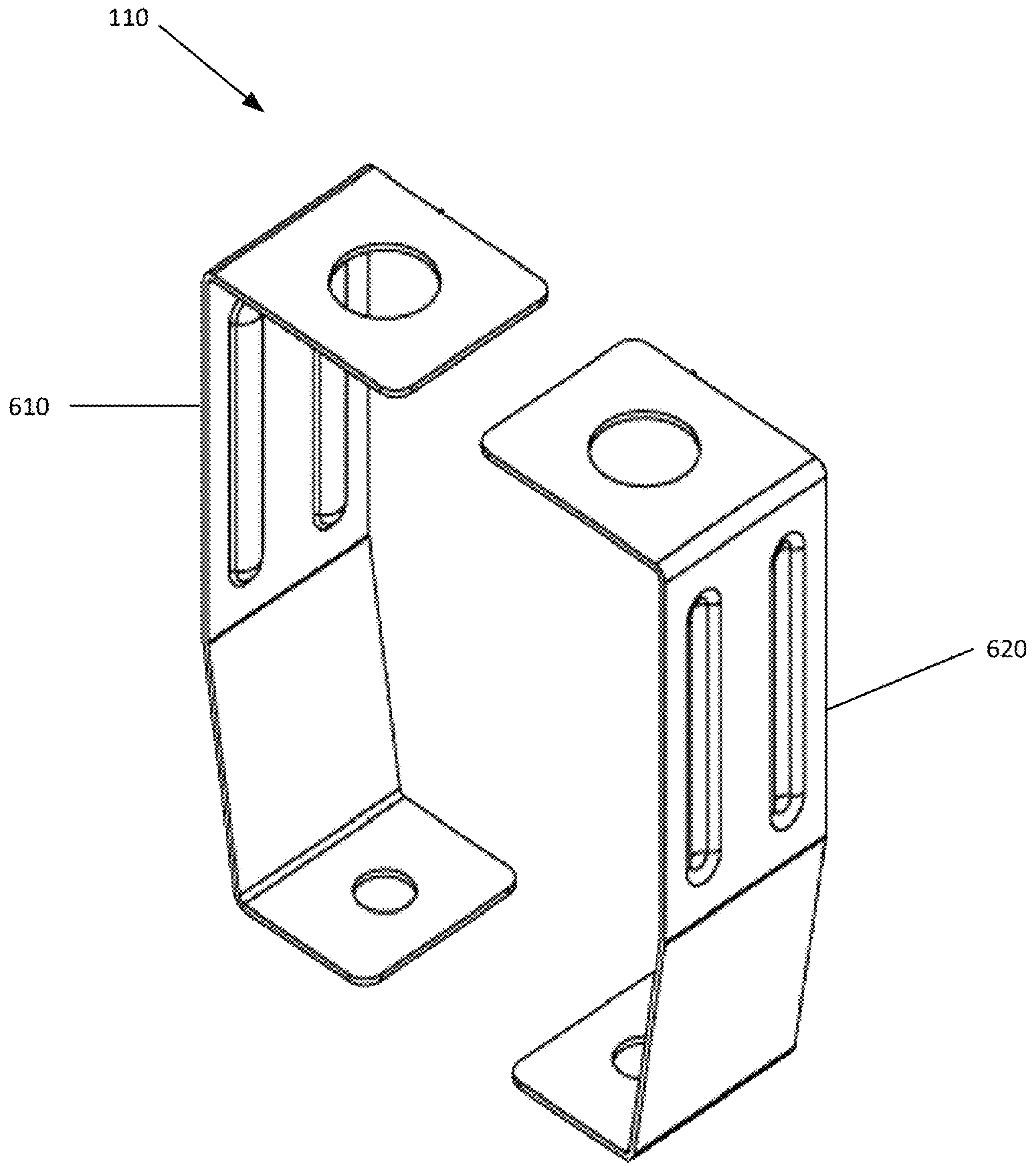
FIG. 6 illustrates a housing of the hanger in FIG. 1.

FIG. 6 illustrates a perspective view of an example of the housing 110. In some cases, the housing 110 includes a first housing bracket 610 and a second housing bracket 620. The first housing bracket 610 and the second housing bracket 620 may be coupled together to form the housing 110. For example, the first housing bracket 610 may include a first surface, a second surface and a side wall connecting the first surface and the second surface. The side wall may include an upper portion and a lower portion divided or separated by a fold or bend therebetween.

The first surface of the first and second housing bracket may have a larger surface area than the second surface. The lower portions of the housing brackets 610, 620 may be acutely angled from the central axis of the housing 110.

The first housing bracket 610 and the second housing bracket 620 may be coupled together by welding the first surface of the first housing bracket 610 to the first surface of the second housing bracket 620 and welding the second surface of the first housing bracket 610 to the second surface of the second housing bracket 620. The welding may include spot welding.

The first housing bracket 610 and the second housing bracket 620 may be coupled together by one or more of bolting, riveting, screwing, adhesive bonding, and soldering.

For example, the first portion of the housing bracket may be between approximately 2 and 3 inches in height. For example, the lower portion of the housing bracket may be between approximately 2 and 3 inches in height. For example, the horizontal width of the housing bracket may be between approximately 2 and 3 inches. For example, the horizontal length of the housing bracket may be between approximately 2 and 3 inches.

Figure 7:
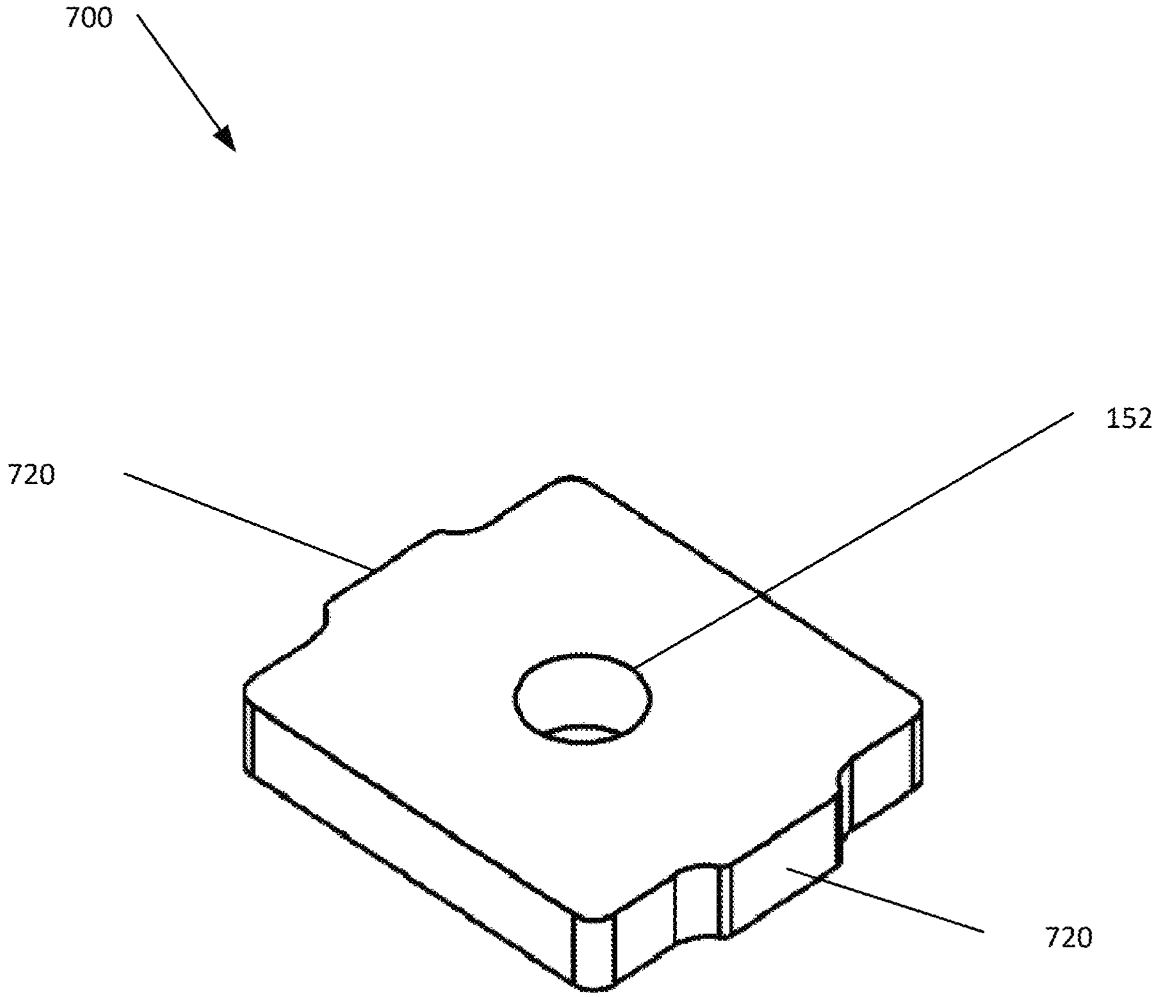
FIG. 7 illustrates a perspective view of an isolation material of the hanger in FIG. 1.

FIG. 7 illustrates a perspective view of an example of a crumb rubber isolator 150. In some cases, the crumb rubber isolator 150 is constructed of rebound crumb rubber. In some cases, the crumb rubber isolator 150 is constructed of recycled rebound crumb rubber. In some cases, the crumb rubber isolator 150 is constructed of bonded crumb rubber. In some implementations, the crumb rubber isolator 150 may include various types or compositions of rubber.

In some cases, the crumb rubber has a density greater than 700 $kg/m^3$. In some cases the crumb rubber has a density less than 1000 $kg/m^3$. In some cases, the crumb rubber has a density ranging from 700 to 1000 $kg/m^3$. In some cases, the recycled rebound crumb rubber has a density ranging from 700 to 1000 $kg/m^3$.

The crumb rubber isolator may include different types of crumb rubber, such as, ambient crumb rubber, cryogenic crumb rubber, mesh crumb rubber, superfine crumb rubber, and colored crumb rubber. In some implementations, the crumb rubber isolator may consist of various sizes of crumb rubber, from 10 mesh to 200 mesh, such as, coarse crumb rubber, medium crumb rubber, fine crumb rubber and micronized crumb rubber. For example, different sizes of crumb rubber include 20 mesh (0.841 mm), 40 mesh (0.4 mm), 80 mesh (0.177 mm), and 100 mesh (0.149 mm).

The crumb rubber isolator may consist of different grades of crumb rubber, based on the different characteristics of the material, and based on the compression deflection rating.

The crumb rubber isolator may by made of GenieMat™ FFNP. By way of background, GenieMat™ FFNP is made of two ingredients, recycled post consumer car tires and a binder which is 94% recycled content. Further, the GenieMat™ FFNP is used for impact sound insulation.

In some cases, the crumb rubber isolators may be constructed of recycled rubber materials that have been sourced from previously used rubber materials that have been processed and repurposed. The recycled rubber materials used to construct, make, or produce the crumb rubber isolators may be recycled, processed and/or repurposed. The recycled rubber may originate from tires, flooring, mats and carpets, sporting goods, automotive parts, and construction materials.

In some cases, the crumb rubber isolator is made of soft crumb rubber which has properties with grade, size, and composition that are more shock absorbent, and flexible. For example, soft crumb rubber may refer to the characteristic of having a relatively low hardness or durometer. It may also refer to having a softer and more flexible characteristic compared to other rubber materials.

The crumb rubber isolator 150 may be shaped like a square disk. In some implementations, the crumb rubber isolator 150 may be ring-shaped. In some cases, the crumb rubber isolator 700 may be shaped to be adjacent to the housing. In some cases, the crumb rubber isolator 700 is configured to be situated, at least in part, in the housing 110 of the hanger 100.

A plurality of crumb rubber isolators 150 may be used in the hanger 100. A plurality of crumb rubber isolators 150 may include any number of the crumb rubber isolator 700. The plurality of crumb isolators may be vertically stacked and/or adjacent. The plurality of crumb isolators may have a central hole or through hole which is configured for a fastener. In some cases, the edge of the through hole may be threaded.

In some implementations, the isolation material used in the isolator may not be limited to merely crumb rubber but includes other types of rubber, for example, neoprene rubber.

In some cases, the diameter of the crumb rubber isolator may be approximately between 1 and 3 inches. In some cases, the height may be between 0.25 and 0.75 inches. In some cases, the diameter of the through hole may be approximately between 0.25 and 0.75 inches.

In some cases, the crumb rubber isolator may be molded into any shape. In some cases, the housing 110 includes a first surface 120, and a crumb rubber isolator bonded to the first surface 120 configured to receive a fastener. The crumb rubber isolator body and the first surface 120 may be bonded together by an adhesive.

As illustrated in FIG. 1, a plurality of crumb rubber isolators may be included in a single hanger 100. The plurality of crumb rubber isolators may be of a common size and shape. Conveniently, these crumb rubber isolators may be cut or otherwise formed from a mat. For example, the crumb rubber isolators may be die cut from a mat. In at least some implementations, the number of crumb rubber isolators included in the hanger 100 may vary depending on desired operating parameters.

As illustrated in FIG. 7, the one or more crumb rubber isolators 150 may include a shape 720 displaced between gussets 410 on the side walls 140 of the housing 110.

Figure 8:
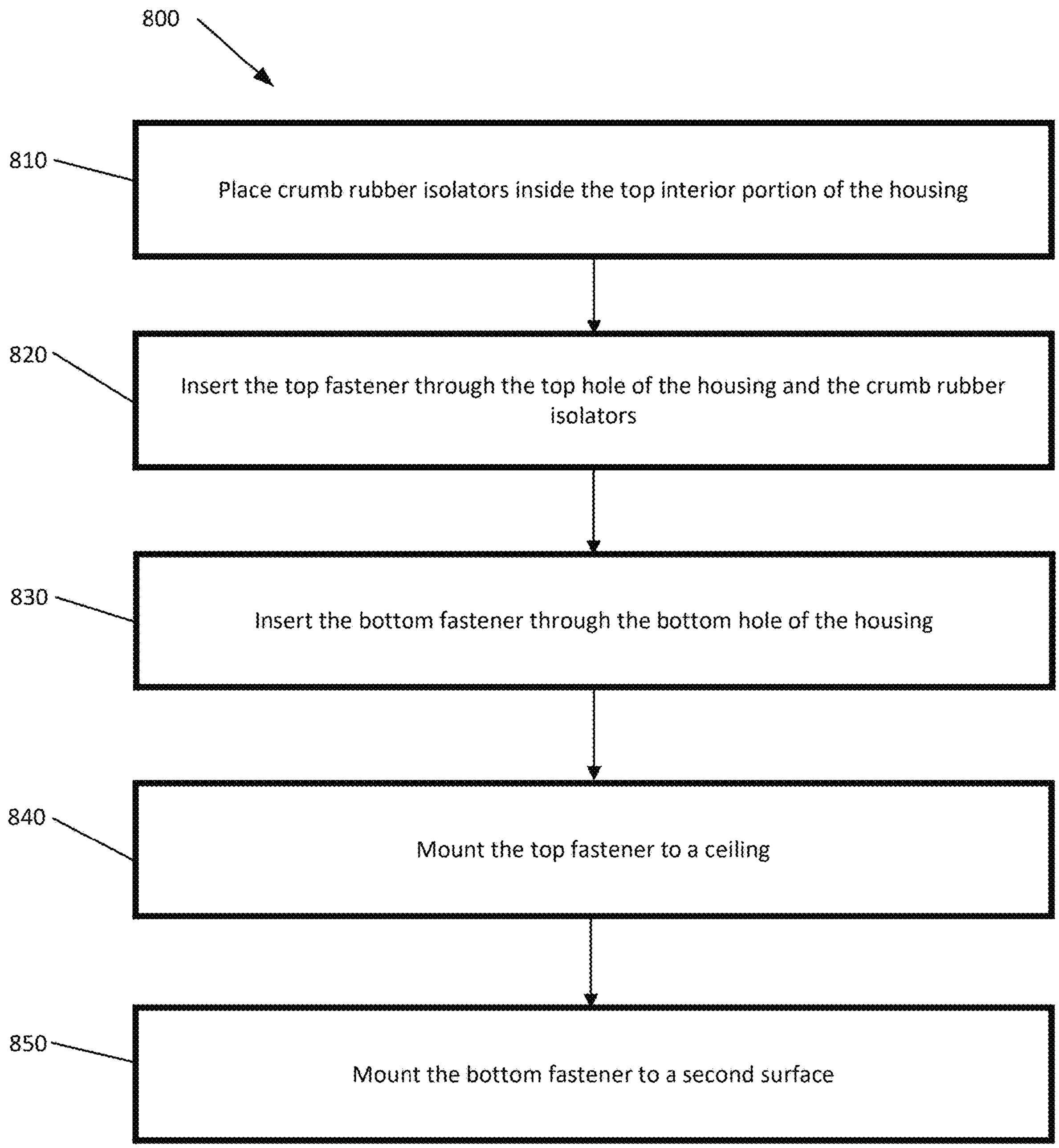
FIG. 8 illustrates an example of a method of installing a hanger.

FIG. 8 illustrates an example of a method 800 of installing the hanger 100. First, at step 810, crumb rubber isolators 150 are placed within one or more cavities of the housing 110 of the hanger 100. The crumb rubber isolators may be axially aligned within the housing 110. Put differently, a hole 152 of each of the crumb rubber isolators may be aligned to allow a first fastener 124, such as a rod to pass therethrough.

In at least some implementations, at step 810, one or more crumb rubber isolators 150 is placed in a cavity of the housing 110 adjacent to the first surface 120. In at least some implementations, one or more crumb rubber isolators 150 is placed in a cavity of the housing 110 adjacent to the second surface 130.

Next, at step 820, a first washer and a first nut may be placed at the proximal end or lower end of the first fastener 124. The first fastener 124 may be inserted from the first surface 120 and the one or more crumb rubber isolators 150 are to engage the first washer and the first nut.

Next, at step 830, a second washer and a second nut may be placed at the proximal end or upper end of the second fastener 134. The second fastener 134 may be inserted from the second surface 130 to engage the second washer and the second nut.

Next, at step 840, the hanger 100 may be mounted to a first surface. The first surface may be a ceiling. The hanger 100 may be mounted to the ceiling using the first fastener. The first fastener may be of the type described above. For example, in some implementations, the first fastener may be or include a screw or bolt that may fasten the hanger 100 using one or more in the housing 110.

Next, at step 850, the hanger 100 may be mounted to a second surface. The second surface may be a surface associated with a vibration source. The hanger 100 may be mounted to the second surface using the second fastener 134. For example, the second fastener 134 may pass through a hole in the second surface and then attached to the second surface using a nut. The second surface may be an HVAC system.

The above discussed embodiments are considered to be illustrative and not restrictive. Certain adaptations and modifications of the described embodiments may be made. All such modification, permutations and combinations are intended to fall within the scope of the present disclosure.

What is claimed is:

1. A hanger for reducing transmission of vibrations between a surface and an apparatus, comprising:
- a housing including:
  - a first surface defining a first hole for receiving a first fastener;
  - a second surface defining a second hole for receiving a second fastener;
  - one or more side walls connecting the first and second surface; and
- one or more crumb rubber isolators having through holes for receiving one or both of the first fastener and the second fastener, the one or more crumb rubber isolators serving as a primary structure for reducing transmission of vibrations between the surface and the apparatus,
- wherein the hanger does not include a spring.

2. The hanger of claim 1, further comprising the first fastener for coupling the hanger to a surface.

3. The hanger of claim 1, further comprising the second fastener for coupling the hanger to a vibration source.

4. The hanger of claim 1, wherein the crumb rubber isolators are constructed of recycled crumb rubber.

5. The hanger of claim 1, wherein the crumb rubber isolators are constructed of at least 94% recycled rubber content.

6. The hanger of claim 1, wherein the crumb rubber isolators are generally disposed within the housing.

7. The hanger of claim 6, wherein the crumb rubber isolators are adjacent to one or both of the first surface of the housing and the second surface of the housing.

8. The hanger of claim 6, wherein the crumb rubber isolators are adjacent to an interior side of the side walls of the housing.

9. The hanger of claim 1, further comprising a first rubber grommet positioned in the first hole and a second rubber grommet positioned in the second hole.

10. The hanger of claim 1, wherein the first and second surfaces and two side walls includes a first and a second housing bracket and wherein each of the first and second housing brackets includes a first face, a second face and a side face connecting the first face and second face.

11. The hanger of claim 10, wherein the first faces of the first and second housing bracket are welded together, and the second faces of the first and second housing bracket are welded together, to couple the first and second housing brackets.

12. The hanger of claim 1, wherein the crumb rubber isolators have a density ranging from 700 to 1000 $kg/m^3$.

13. The hanger of claim 1, wherein the first hole of the first surface, the second hole of the second surface, and the through holes of the crumb rubber isolators are centered and aligned.

14. The hanger of claim 1, wherein the first and second fasteners include washers, nuts, and threaded rods.

15. The hanger of claim 1, wherein the one or more side walls of the housing have gussets and the crumb rubber isolators are shaped to fit therebetween.

16. The hanger of claim 15, wherein one or more of the crumb rubber isolators interlock with the gussets.

17. The hanger of claim 1, wherein the first surface has a larger surface area than the second surface of the housing, and wherein the one or more side walls near the second surface are tapered.

18. The hanger of claim 1, wherein the housing and the crumb rubber isolators are generally rectangularly shaped.

19. A hanger assembly for reducing transmission of vibrations, comprising:
- a surface;
- a vibration source;
- a hanger, comprising:
  - a first fastener for coupling the hanger to the surface;
  - a second fastener for coupling the hanger to the vibration source;
  - a housing including:
    - a first surface defining a first hole for receiving the first fastener;
    - a second surface defining a second hole for receiving the second fastener;
    - two or more side walls connecting the first and second surface; and
  - one or more crumb rubber isolators having through holes for receiving one or both of the first fastener and the second fastener, the one or more crumb rubber isolators serving as a primary structure for reducing transmission of vibrations between the surface and the apparatus, wherein the hanger does not include a spring.

* * * * *